Dec. 31, 1968     G. F. NORDBLOM     3,419,901
METHOD FOR PRODUCING FLAKES OF NICKEL
Filed Feb. 18, 1966
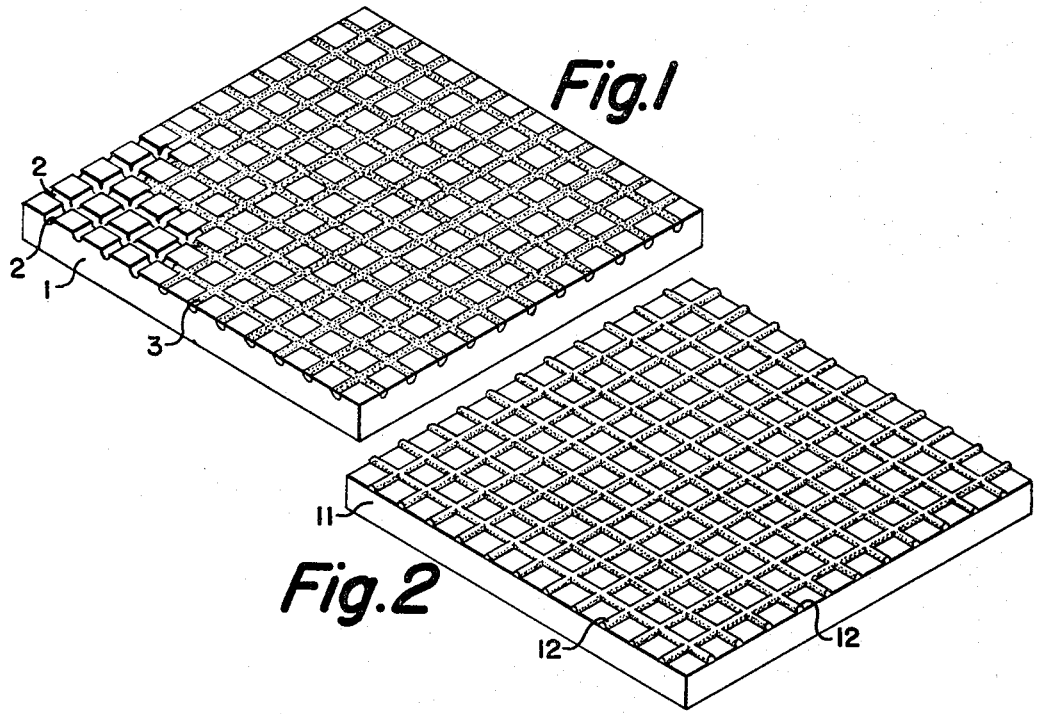
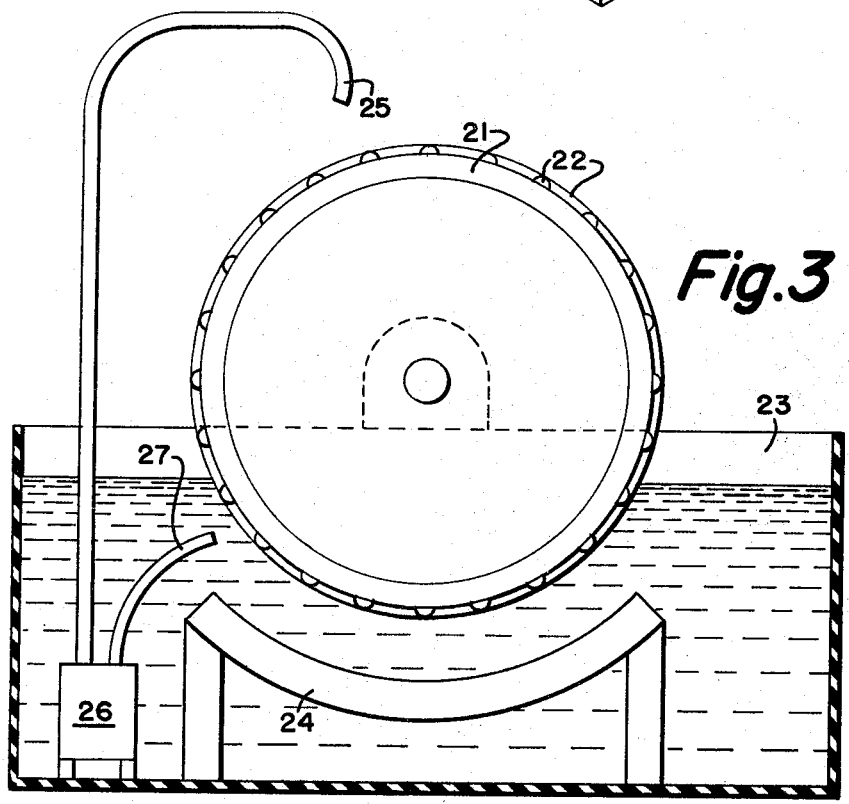

United States Patent Office 3,419,901
Patented Dec. 31, 1968

3,419,901
METHOD FOR PRODUCING FLAKES OF NICKEL
George F. Nordblom, Yardley, Pa., assignor, by mesne assignments, to ESB Incorporated, Philadelphia, Pa., a corporation of Delaware
Filed Feb. 18, 1966, Ser. No. 528,543
5 Claims. (Cl. 204—10)

ABSTRACT OF THE DISCLOSURE

Small flakes of metallic nickel, about $\frac{1}{16}$ inch square and about 0.000040 inch thick, are deposited from solution onto a cathode. A grid made from an electrically non-conducting material is disposed on the cathode surface. Flakes are removed from the cathodes by sprays of electrolyte or other fluids. The flakes are suitable for use in nickel-alkaline batteries.

---

This invention relates to a method of producing flakes of nickel, and to the apparatus used to produce the flakes.

This invention is related to one disclosed in another application filed on the same date as this one, in which George W. Bodamer and I are applicants.

Small flakes of metallic nickel, about $\frac{1}{16}$ inch square and about 0.000040 inch thick, are usually packed in the tubular positive plates of nickel-alkaline batteries along with nickel oxyhydrate active material to increase the conductivity of the positive plates. Since the days of Thomas Edison these flakes have been produced by electro-depositing numerous alternate layers of nickel and copper on a cathode in electrolyte baths to form large sandwiched sheets. The sheets have then been cut into small squares, following which the copper layers were dissolved out, leaving only the tiny nickel flakes. The flakes were then washed, dried, and screened before being put into the positive plates of the battery. This long-known process has produced flakes which were generally satisfactory, but the process was objectionable because it was expensive. This old process was characterized by loss of nickel during the copper dissolution step, failure of the flakes to become completely separated, high copper losses and recovery costs, and cumbersome and expensive mechanical and electrochemical processes. What has been needed for many years was a process of making nickel flakes of the desired shape in which the deposition and subsequent dissolution of copper could be eliminated, for both steps were time consuming and the expense involved was great.

It is the object of this invention to provide a process by which nickel flakes can be deposited directly on the cathode, and subsequently be easily removed, and which will produce flakes suitable for use in nickel-alkaline batteries.

It is a further object of the invention to provide apparatus suitable for producing nickel flakes.

Methods of producing nickel flakes to be used for other purposes are known, but the flakes produced by these processes have proved to be unsatisfactory for use in nickel-alkaline batteries. For instance, in United States Patent No. 2,365,356, issued on Dec. 19, 1944 to N. Pilling and A. Wesley, there is disclosed a method of producing nickel flakes to be used in paint pigments. In this process a highly strained deposit of sheet nickel is produced so that the plated nickel will break up automatically into flake and slough off the stainless steel cathode. This process has proved to be unsatisfactory for producing flakes for batteries, because the flakes so produced tend to curl very tightly; to be satisfactory for use in batteries the flakes must remain essentially flat. The flakes produced by this process are also too thick for satisfactory use in batteries.

This invention involves the use of a cathode the surface of which has been divided into small areas by lines of non-conducting material disposed on the surface. Nickel then is deposited on the exposed conducting portions of the cathode surface, flakes being formed because the conducting portions of the surface are separated from one another. The flakes are subsequently removed from the cathode surface. As will be shown in greater detail, below, several methods of applying nonconducting material to the surface of the cathode may be used, and also several methods of removing the flakes are available.

The invention will be explained in greater detail by making reference to the drawings, in which:

FIGURE 1 is a pictorial view of a cathode plate in which the non-conducting material is deposited in grooves cut in the surface of the cathode;

FIGURE 2 is a cross-sectional view of a cathode plate in which the non-conducting material is deposited on the surface of the cathode in beads;

FIGURE 3 is a cross-sectional view of a cylindrical cathode in which a lined grid made from non-conducting material is deposited on the surface of the cathode in beads.

The cathode must be made from a material which will permit the nickel to be removed from its surface; stainless steel or chrome-plated steel are known to be acceptable materials meeting this requirement.

As was stated above, several methods of applying non-conducting material to the surface of the cathode may be used. One acceptable method, illustrated by Example I and FIGURE 1, is to groove the cathode like a waffle iron and then fill the grooves with the non-conductor.

EXAMPLE I

A stainless steel plate 1 being $\frac{1}{4}$ inch thick was used for a cathode, with grooves 2 of 0.020 inch depth being machined into the surface $\frac{1}{16}$ inch apart in both directions. The grooves were filled with an epoxy resin 3 which would polymerize rather than harden through solvent evaporation. A pictorial view of the plate 1 with the non-conducting material 3 in the grooves 2 is shown in FIGURE 1. The cathode was then polished metallographically, following which a light layer of hard baking phenolic resin was applied as a thin coat over the cathode panel and the panel was lightly polished to cut through the resin covering the stainless steel. The baking resin served to prevent the nickel flakes from plating over the edges of the $\frac{1}{16}$ inch squares and becoming locked in place. The cathode was then submerged into a nickel sulfamate bath for a period of 15 seconds, and a current applied between the cathode and the anode. The composition and temperature of the bath and the current density applied will be described later. It was found that the resulting nickel flakes could be easily washed from the cathode by a stream of water or an electrolyte.

A second method of applying the non-conducting material to the surface of the cathode, illustrated in Example 2 and FIGURE 2, involves ruling the material on the cathode so that the material projects upward from the surface rather than being disposed in grooves.

EXAMPLE II

Before applying non-conducting grid material, the surface of a stainless steel cathode plate 11 was electro-polished by submerging the plate in a bath consisting of 92 milliliters of phosphoric acid, 69 milliliters of sulphuric acid, 9 grams of chromic acid, and 30 milliliters of water, the bath being at about 60° C., and subjecting the plate to a current density of 4 amps/square inch for from 2 to 4 minutes. This electro-polishing is found to make removal of flake easier. Next, beads or ridges 12 of nonconducting thinned phenolic resin diluted 1:1 with isopropyl alcohol containing 5% water were ruled on the surface in perpendicular directions to form squares 1/16 inch along a side on the surface of the cathode. See FIGURE 2 for a cross-section of the plate and beads of material. A draftsman's pen may be used for the ruling. The plate was then baked in an oven at 177° C. for 20 minutes to increase the life of the nonconducting resin beads. When the gridded cathode so formed was submerged in the nickel sulfamate bath of Example I for a period of 15 seconds, nickel flakes were formed which could be readily washed from the surface of the cathode.

Alternatively the stainless steel cathode may be mechanically polished, or chrome plated cathodes may be used.

Other materials may be ruled on the cathode surface in addition to the phenolic resin listed above. Among other commercially available materials tried, Ebony Black asphalt base paint proved to be most satisfactory, but acceptable nickel flake was produced by using Sealit (a rubber base compound), Metal Etch Resist (a plastic) diluted with a xylene base thinner, photo sensitive lacquer (dried and subsequently immersed in developing solution), and an alkaline water solution of Carboset 525 resin (a thermoplastic film-forming acrylic resin) whose neutralizing agent is later volatilized. The grids formed by these last-mentioned materials did not last as long as the grid made from the asphalt base paint, but the flake produced was acceptable. There are no doubt numerous suitable materials which could be used to cast a grid on the cathode surface, and this invention should not be regarded as being limited to any particular materials. The examples listed above are merely illustrative. The requirements for the material are that it be electrically non-conductive, capable of adhering to the surface of the cathode, and non-reactive with electrolyte containing the nickel ions; any material satisfying these requirements will be satisfactory, though some materials may be more suitable than others.

Another method of applying nonconductive material to the surface of the cathode to form a grid network thereon involves a continuous process of making nickel flake, and is illustrated in FIGURE 3. Using a cylindrical rather than a flat plate cathode 21, the nonconducting grid material 22 may be placed in grooves cut into the surface of the cathode 21, as appears in Example I and FIGURE 1, or may be ruled or painted on the surface, as shown in Example II and FIGURE 2. The cathode 21 can then be entirely or partially submerged in the electrolyte bath 23 along with the anode 24 and used in a continuous process. A jet 25 of electrolyte, from a pump 26, may be used to wash the nickel flakes from the surface of the cathode. If desired, a second jet 27 disposed in the electrolyte may be used to remove hydrogen or other gases from the grid if such gases are found to collect on the cathode as it passes through the electrolyte.

The invention is not to be limited to use with one or more particular nickel ion electrolyte baths, for no doubt many solutions could be found which would be acceptable. In Examples I and II above reference is made to a nickel sulfamate bath. This bath consisted of 150 grams/liter of nickel carbonate, 250 grams/liter of sulfamic acid, 26 grams/liter of boric acid, and 37 milliliters/liter of an 18% nickel bromide solution. When this bath was at 48° C., current densities as high as 200 amps/square foot could be used successfully; at 39° C., a current density of 100 amps/square foot proved satisfactory.

A bath of nickel fluoborate also produced acceptable flake. Consisting of 30 ounces per gallon of nickel fluoborate containing 7½ ounces per gallon of metallic nickel, the bath produced good flake when a current density of 85 amps/square foot and the temperature of the bath was 40° C.

The preferred method of removing the nickel flakes from the cathode is to use a spray of electrolyte because this is generally satisfactory. Jets of other fluids can likewise be used where they will not contaminate or dilute the plating bath. The choice of which way the flake is removed depends on economics.

The nickel flakes produced by any of the methods described above, which involve depositing nickel on a gridded cathode, have been placed in batteries and compared with the nickel produced by the old method, in which copper is first plated in alternate layers with the nickel and then later dissolved. Flakes produced by the Edison process were packed into tubes and tamped with a machine having a tamper weighing 1581 grams. Alternate layers of active material and nickel flake were packed into the tube until the tube contained 210 layers of each material. Each layer of active material consisted of 0.0326 grams, and the nickel flake comprised 13.6 percent of the total material introduced into the tube. After being formed against a cadmium negative, the tube was charged at 93 milliamps for 15 hours, rested an hour, discharged at 187½ milliamps, and run through 16 charge-discharge cycles. The average capacity developed using this Edison-type flake was 0.155 ampere hours/gram. Utilizing flake produced by the methods described above in which the sulfamate electrolyte was used, this test procedures was repeated, with the only variation being that the amount of flake used was 13.9 percent of the total; the capacity of this tube was 0.158 ampere hours/gram. Utilizing flake produced by the methods described above in which the fluoborate electrolyte was used, this test procedure was again repeated, with the amount of flake used being 9.0 percent of the total; the capacity of this tube was 0.153 ampere hours/gram. The comparisons warrant the conclusion that the nickel flakes produced by this invention are as acceptable as those made by the former method.

Having described my invention so that those familiar with the art may understand it, what I claim is the following:

1. A method of producing nickel flake which comprises:
  (a) immersing into an electrolyte bath containing nickel ions a cathode whose surface is divided into a grid by electrically non-conducting material disposed on the cathode;
  (b) applying an electric current through the electrolyte bath between the cathode and an anode also immersed in the electrolyte to deposit nickel on the exposed areas of the gridded cathode; and,
  (c) removing the nickel from the grids of the cathode by the force of a stream of fluid.

2. The method of claim 1 wherein the cathode is removed from the electrolyte bath after the nickel is deposited on the cathode but before the nickel is removed from the cathode.

3. The method of claim 1 wherein the nickel is removed from the cathode while the cathode is in the electrolyte.

4. The method of claim 1 wherein the nickel is removed from the gridded cathode by the force of a stream of the electrolyte.

5. The method of claim 1 wherein the nickel is removed from the gridded cathode by the force of a stream of water.

References Cited

UNITED STATES PATENTS 2,365,356  12/1944  Pilling et al. _____ 106—290
2,773,816  8/1952  Wesley et al. _____ 204—12

FOREIGN PATENTS 776,136  1/1968  Canada.

JOHN H. MACK, *Primary Examiner.*

R. L. ANDREWS, *Assistant Examiner.*

U.S. Cl. X.R.

204—216